(12) United States Patent
Wübbels et al.

(10) Patent No.: US 6,374,587 B1
(45) Date of Patent: Apr. 23, 2002

(54) HARVESTING DEVICE FOR HARVESTING EARS OF CORN AND SIMILAR CROPS

(75) Inventors: Richard Wübbels, Rhede; Norbert Wolters, Gescher, both of (DE)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 09/617,855

(22) Filed: Jul. 17, 2000

(30) Foreign Application Priority Data

Aug. 21, 1999 (DE) .......................................... 199 39 723

(51) Int. Cl.⁷ ............................................... A01D 45/02
(52) U.S. Cl. ............................................. 56/103; 56/94
(58) Field of Search ........................... 56/94, 105, 103, 56/104, 62, 119, 14.4, 44.5

(56) References Cited

U.S. PATENT DOCUMENTS

| | | | |
|---|---|---|---|
| 2,527,190 A | | 10/1950 | Kuhlman |
| 3,517,490 A | | 6/1970 | Mathews |
| 3,736,730 A | | 6/1973 | Dobson |
| 3,930,354 A | * | 1/1976 | Borderie .......................... 56/94 |
| 3,940,913 A | * | 3/1976 | Wallenfang et al. ............ 56/98 |
| 4,143,504 A | * | 3/1979 | Noack et al. .................... 56/98 |
| 4,350,207 A | * | 9/1982 | Ben-Dor ....................... 171/58 |
| 4,594,842 A | * | 6/1986 | Wolters et al. .................. 56/94 |
| 5,255,500 A | | 10/1993 | von Allwoerden |
| 5,354,003 A | * | 10/1994 | Stokes ....................... 241/101.7 |
| 5,546,737 A | | 8/1996 | Moosbrucker |
| 5,651,243 A | * | 7/1997 | Arnold et al. ................... 56/94 |
| 5,722,225 A | | 3/1998 | Wuebbels et al. |
| 5,787,696 A | * | 8/1998 | Wiegert et al. ................ 56/104 |
| 5,832,707 A | | 11/1998 | Arnold et al. |

FOREIGN PATENT DOCUMENTS

| | | |
|---|---|---|
| DE | 36 16717 A1 | 11/1987 |
| EP | 0 378 277 | 7/1990 |
| FR | 1 452 511 | 12/1966 |

* cited by examiner

*Primary Examiner*—Robert E. Pezzuto
*Assistant Examiner*—Árpád Fábián Kovács

(57) ABSTRACT

A harvesting device for the harvesting of ears of corn or of similar grain crops for mounting on a self-propelled agricultural harvesting vehicle, in particular a combine or a chopper forage harvester, equipped with a picking device for ears of corn. The picking device consists of an ear holding device with at least one picking gap and at least one picking cylinder, located below the picking gap, for the purpose of pulling of the corn stalks in a downward direction and ripping the ears of corn off their stalks. The ear holding device is formed by at least one picking disk that rotates around a vertical shaft and features at least one picking gap that runs in the rotation direction and is open at the outer periphery of the picking disk. A covering device, which partially reaches over the topside of the picking disk, forms at least one conveying channel for the transport of the ripped-off ears of corn to the harvesting vehicle.

21 Claims, 3 Drawing Sheets

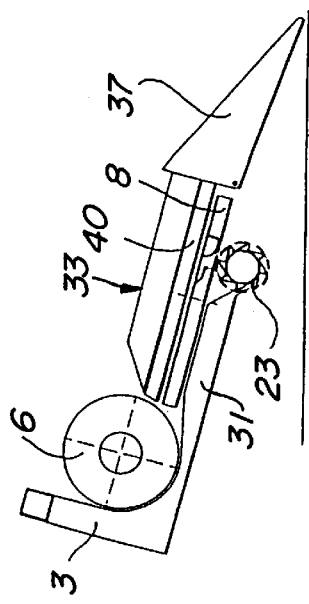
Fig. 1
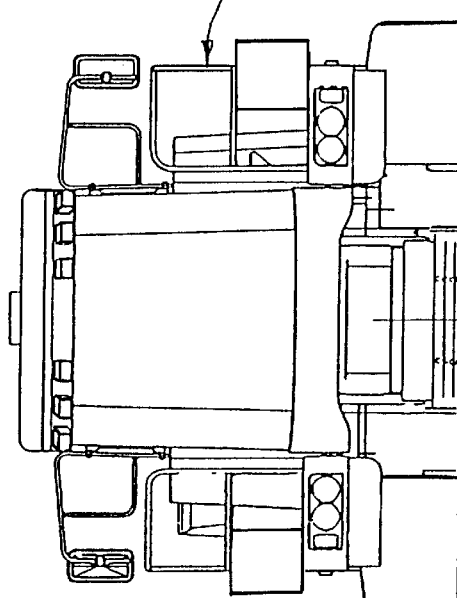
Fig. 2
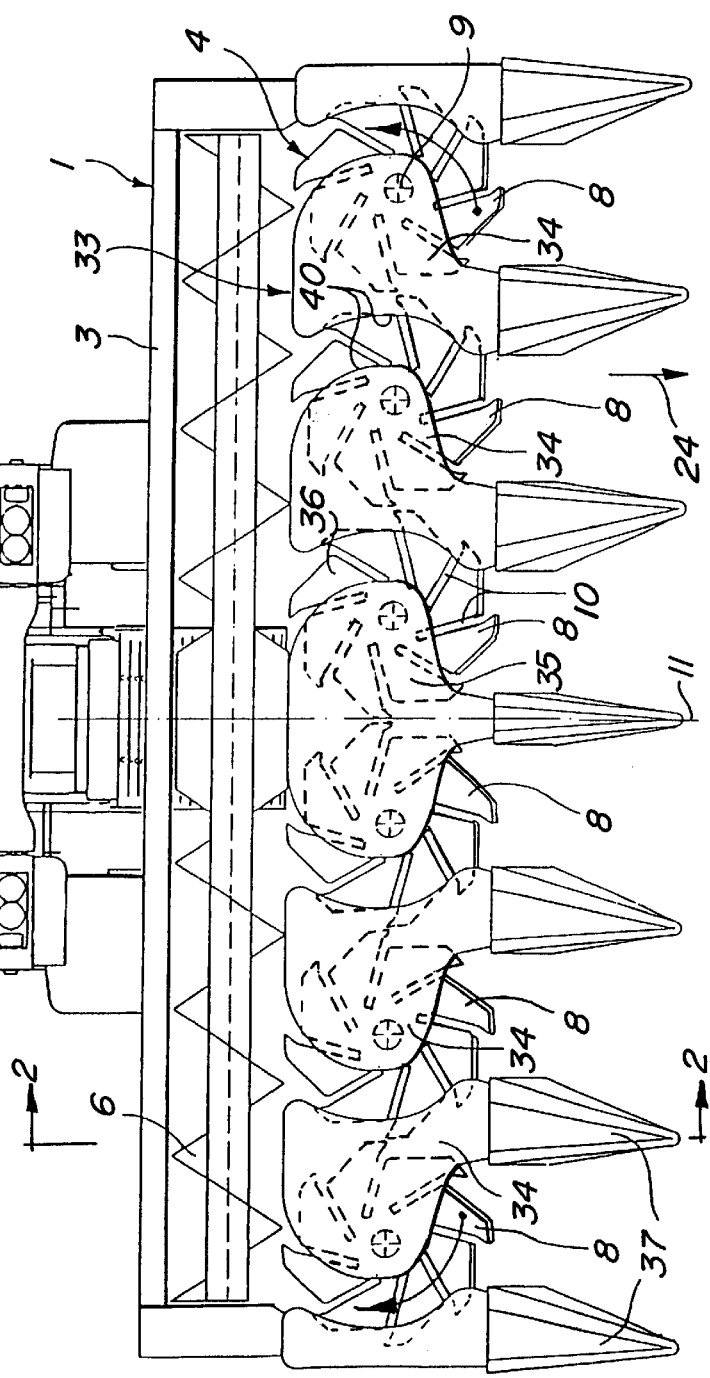

HARVESTING DEVICE FOR HARVESTING EARS OF CORN AND SIMILAR CROPS

BACKGROUND AND SUMMARY OF THE INVENTION

The invention concerns a harvesting device for harvesting ears of corn or similar crops for mounting on a self-propelled agricultural harvesting vehicle, in particular on a combine or a chopper forage harvester.

In known harvesting devices of this type, the picking devices for the ears of corn are configured in a way that permits them to receive the corn plants, which are customarily grown in rows, only in a row sequence. This is conditioned by the configuration of the picking gap that extends in the longitudinal direction of the harvesting vehicle by the location of the picking cylinder or picking cylinders below the picking gap with their rotational axes being oriented in the driving direction.

This row-oriented mode of operation makes harvesting difficult if the distances between the plants in the field differ and more so when picking up laid corn that is strewn over the ground irregularly. In particular, however, driving the harvesting vehicle across the rows of plants as can be recommended for a steady harvesting operation is largely excluded due to the row-oriented orientation of the picking gap.

The invention is based on the task of developing a harvesting device for the harvesting of ears of corn or similar types of crops for mounting on a self-propelled agricultural harvesting vehicle in particular a combine or a chopper forage harvester, the picking device of which is configured in such a way that it can receive the plants and pick the ears of corn or other crops from their stalks independent from row formation.

According to the invention, the ear holding device consists of one or several picking disks, which can rotate around a vertical shaft and in each of which at least one picking gap is formed. The field can be harvested independent from row formation due to the picking gaps rotating in the rotating direction of the picking disk since the picking gaps are not irreversibly mounted in the driving direction of the vehicle, as is the case in known picking devices. Instead, the picking disks grab the corn stalk in their rotational movement independent from the row formation within an area of a moving sector of the picking disk that precedes the harvesting vehicle in its driving direction. As the picking disk continues to rotate, the corn stalk is inserted into the picking gap, inward toward the rotating point of the picking disk. The ears of corn, which are subsequently ripped off by means of the picking cylinder, which is located below the picking gap, can now be transported away by means of conveying channels that are configured above the covering device, toward the harvesting vehicle in order to be conveyed either to a combine or to a chopper forage harvester as a harvesting vehicle for further processing. As a matter of principle, however, the device can also be mounted on a different type of self-propelled agricultural harvesting vehicle that only collects the picked ears of corn or similar crops in order to transport them to a different location for further processing.

BRIEF DESCRIPTION OF THE DRAWINGS

FIG. 1 is a frontal view of a harvesting device for the harvesting of ears of corn or similar crops as an addition to or as a header on a self-propelled agricultural harvesting vehicle.

FIG. 2 is a cross sectional view of the harvesting device according to FIG. 1 mounted on the harvesting vehicle.

DETAILED DESCRIPTION OF THE PREFERRED EMBODIMENT

Figure 4:
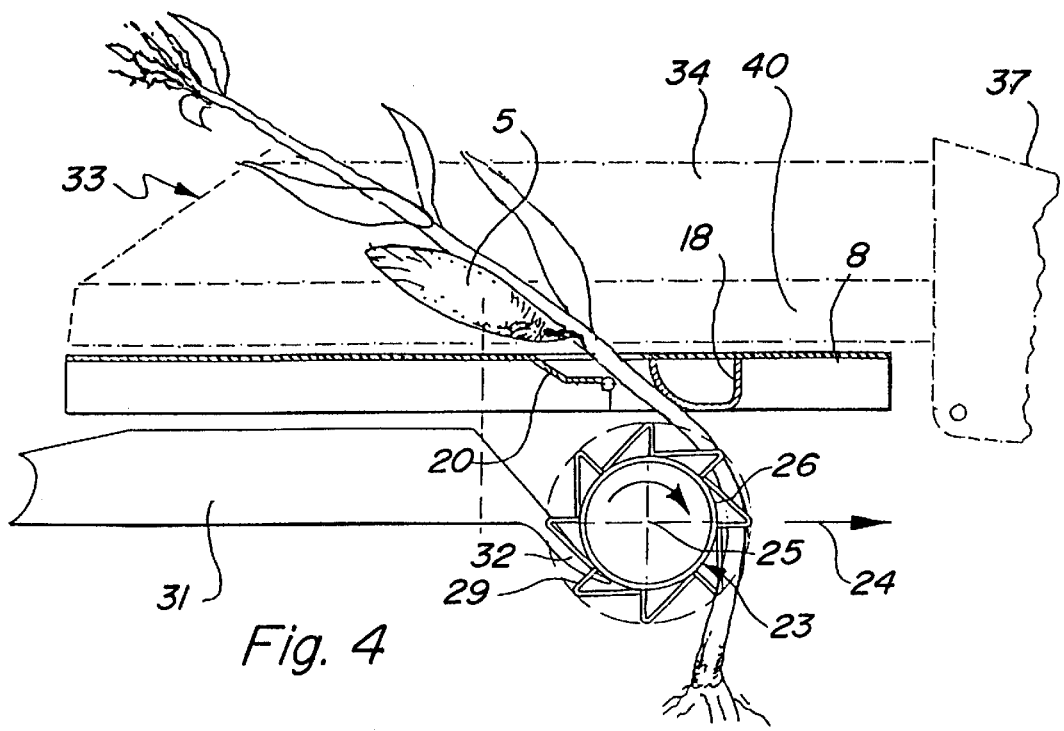
FIG. 4 is a cross sectional view of the detail of the picking device according to FIG. 3.

In FIG. 1 a harvesting device, as a whole designated with the number 1, for the harvesting of ears of corn or similar crops is shown. The harvesting device is a front-mounted header on a self-propelled agricultural harvesting vehicle 2, in the example shown, a combine. A basic frame 3 of the harvesting device 1 supports a picking device 4 with which, in the example shown, ears of corn 5 (FIGS. 4 and 5) are picked from their stalks and transported to the vehicle 2 by means of a cross auger 6. For harvesting operations, the picking device 1 is mounted on the vehicle 2 in a steep forward angle, as is shown in FIG. 2 by a symbolic soil line 7.

In the example shown, the picking device 4 comprises a multitude of picking disks 8 that can each rotate around a vertical shaft 9. Each disk 8 features a multitude of picking gaps 10 that rotate in the rotating direction 13. In the example shown, six picking disks 8 are provided, the vertical shafts 9 of which are positioned in a common vertical cross plane of the picking device 4. In this arrangement, three picking disks 8 each are positioned to each side of the vertical longitudinal center plane 11 of the picking device 4. As is indicated by motion direction arrows in FIG. 1, the picking disks 8 rotate clockwise on one side of the vertical longitudinal center plane 11 and counter clockwise on the other side.

Figure 3:
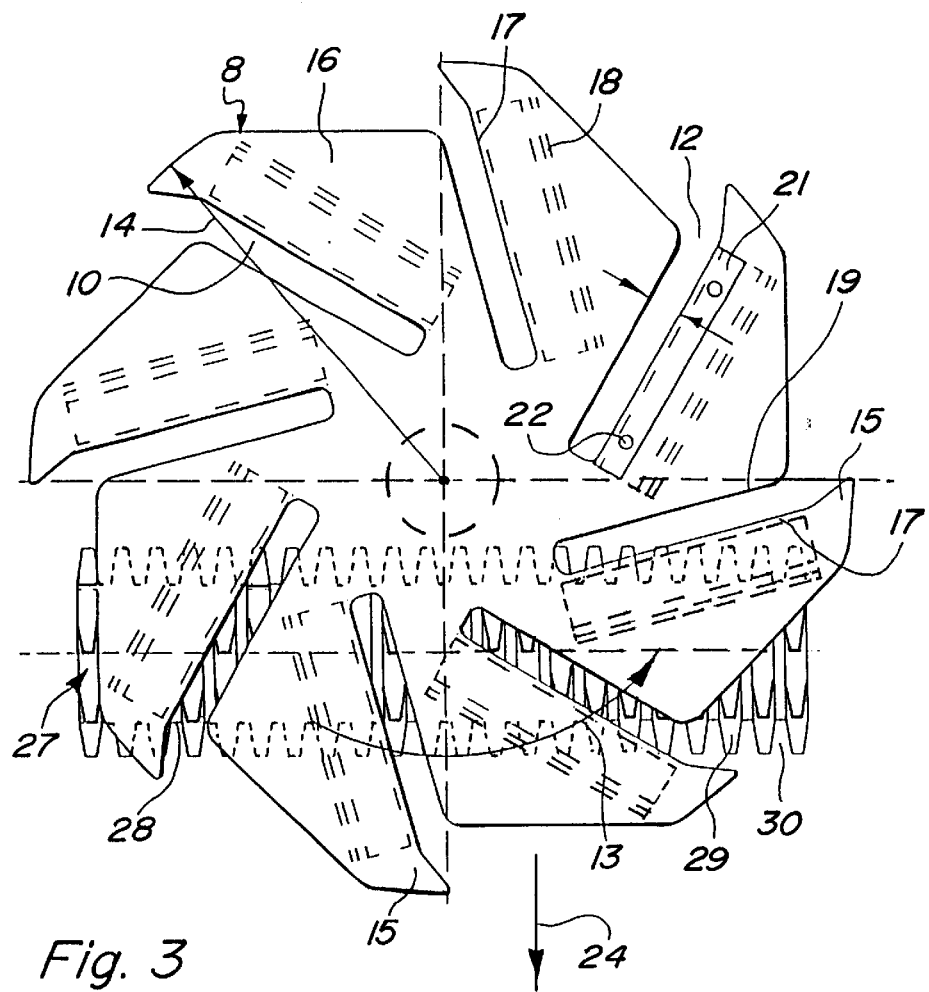
FIG. 3 is an enlarged plan view of the picking device of the harvesting device according to the FIGS. 1 and 2.

With reference to FIG. 3, the example shown, eight picking gaps 10 are configured in each of the picking disks 8 that are open at the circumference of the picking disk 8. The basic orientation of the picking gaps 10 is radial. In the example shown, starting from the peripheral opening 12, the picking gaps have a divergent orientation that is counter to the rotating direction 13 of the picking disk 8 in relation to a radius 14 of the picking disk 8 that runs across the area of the opening. That is, the picking gap diverges further behind the radius 14 in the direction of rotation of the picking disk from the outer opening 12 to the closed end of the picking gap. This embodiment improves the grabbing effect with regard to the grabbed corn stalks. A grabbing tip 15 of each picking disk segment 16, formed between two picking gaps 10, extends in the rotating direction 13 of picking disk 8 and reaches over the area of the opening 12 of each picking gap 10. This facilitates the grabbing of the corn stalks, with the picking disk 8 rotating, and the insertion of the corn stalk into the correlated picking gap 10.

With reference to FIG. 4, a pressure pad 18 is located along the trailing edge 17 of each picking gap 10, in the direction of rotation 13. The pressure pad 18 can be formed by a sheet metal part that is attached to the bottom side of the picking disk 8 in a known manner not further described.

Along the leading edge 19 of each picking gap 10, the picking disk 8 features a cob catching channel 20, which is shown only in FIG. 4 and which can be constituted by a deformation in the plate material of the picking disk 8.

In order to be able to modify the width of the picking gap 10, an adjustable edge trim 21 may be provided along one of the edges 17,19 of each picking gap 10. One such adjustable edge trim 21 is shown in FIG. 3. In the example shown, the adjustable edge trim 21 is correlated with the trailing edge 17 of the picking gap 10. After loosening the screws 22, the adjustable edge trim 21 can, as indicated by the arrows in FIG. 3, be shifted in its position in order to modify the width of the picking gap 10 and be fixed in its chosen position by tightening the screws 22 again.

A picking cylinder in the form of a toothed roller 23 serves to pull down and remove the corn stalks and to rip off the ears of corn 5 from their stalks while the stalks are passing through the picking gap 10. The roller 23 extends, as shown in the example drawing, perpendicular to the driving direction 24 of the vehicle 2 and is correlated with all of the picking disks 8 and consequently with their rotating picking gaps 10. The toothed roller 23 extends in this design continuously between the lateral ends of the base frame 3 and is connected with a rotating drive such as is known for rotating the conveying auger 6 and not further shown in detail, so it can rotate around a horizontal shaft 25. In this design, the toothed roller 23 is positioned ahead, in driving direction 24, of the rotating shafts 9 of the picking disks 8 or ahead of the vertical cross plane containing the rotation shafts 9 of all of the picking disks 8. As a matter of principle, a position of the toothed roller 23 in the driving direction 24 behind the cross plane containing the rotation shafts 9 of the picking disks 8 is also possible.

The toothed roller 23 is formed by a multitude of toothed rings 27 that are supported on the roller body 26 and axially spaced a distance 28. The axial distance 28 is approximately 0.5–1 times the axial length of the individual toothed rings 27.

Between axially adjacent teeth 29 of the toothed roller 23, A feeding gap 30 is formed for the corn stalks that widens conically radially outward. For this purpose, the teeth 29 are tapered off in a radially outward direction.

A stripper device 31 is mounted on the rearward side of the toothed roller 23 in the travel direction. The stripper device 31 may be spring actuated in the direction toward the picking disks 8 and is provided for the purpose of cleaning the toothed roller 23. The stripper device 31 is comb-shaped, reaching with its teeth 32 into the area of the spaces 28 between the toothed rings 27 in order to rid the toothed roller 23 of stalk parts of the corn plant, which after completion of the harvesting of the ears of corn 5 remain on the field in order to be later chopped and plowed under.

The covering device 33 that partly covers the picking disks 8 on their topside is shown in particular in FIGS. 1 and 2. The covering device 33 consists of individual covering plates 34 and 35 in extension of divider tips 37 that are customary in harvesting machines of this type. The covering plates are supported on the basic frame 3. The covering plates 34 are each correlated with individual external picking disks 8 at both sides of the vertical longitudinal center plane 11, while the covering plate 35 forms a common covering element for the two picking disks 8 in the center. The covering plates 34, 35 form, in this design, conveying channels 36 that extend in the shape of a bow above the picking disks 8. The bow-shaped course of the conveying channels 36 is based upon the rotational direction, indicated by motion arrows in FIG. 1, of the picking disks 8 for the conveyance of the picked ears of corn 5 into one of the halves of the conveying auger 6 at both sides of the vertical longitudinal plane 11. The halves of the conveying auger transport the ears of corn in a known manner to the center, from where they are further transported to the harvesting vehicle 2.

Figure 5:
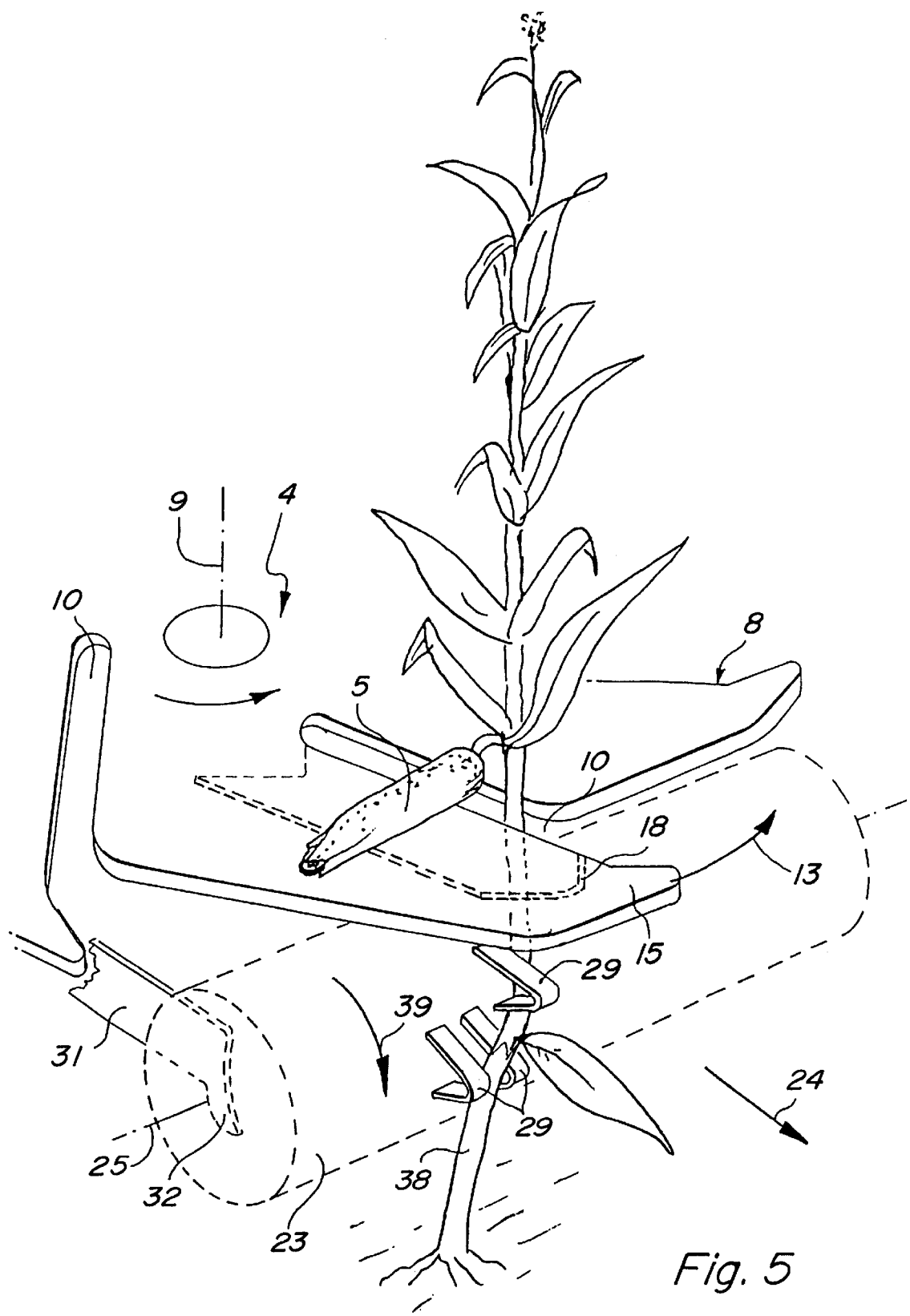
FIG. 5 is an enlarged perspective view of the picking device in connection with a corn plant.

The mode of operation of the picking device 4 is now explained by means of FIG. 5. While the harvesting device 1 moves forward in driving direction 24, firstly the corn stalk 38 is grabbed by the rotating picking gaps 10 independent from any row pattern and is run between two adjacent teeth 29 of the toothed roller 23. In this process, a cross conveyance occurs in the rotating direction 13 of the picking disk 8. By means of the rotating movement in the direction of the arrow 13, and the simultaneous forward movement in the driving direction 24, the grabbed stalk 38 is run deeper into the picking gap 10 toward its closed inner end. At the same time, the stalk 38 is grabbed by another tooth 29 of the toothed roller 23, which rotates in the direction of the arrow 39 and in this manner, in combination with the cross conveyance in the direction 13, the stalk is jammed at the toothed roller 23. In this process the corn stalk 38 is securely held in the picking gap 10, which enters into conveying channel 36 and thus into a chamber that at its edges is enclosed by the face walls 40 of the covering plates 34, 35. Simultaneously, the corn stalk 38 in the picking gap 10 is pulled downward with the continued rotating movement of the toothed roller 23 in the direction of rotation 39. Above the picking gap 10, the ear of corn, which is bigger than the picking gap 10, is picked with the added support of the pressure pad 18, then collected on the topside of the picking disk 8 in the pertinent conveying channel 36 between the covering plates 34, 35 and then conveyed in the direction of the arrow 13 to the conveying auger 6 due to the continued rotating movement of the picking disk 8. The stripper 31 cleans with its teeth 32 the toothed roller 23 from attached plant material so that the gripping and jamming function of the teeth 29 of the toothed roller 23 is preserved throughout the harvesting operation.

The invention should not be limited to the above-described embodiment, but should be limited solely by the claims that follow.

What is claimed is:

1. A harvesting device for the harvesting of ears of corn or of similar crops for mounting on a self-propelled agricultural harvesting vehicle with a picking device (4) for ears of corn comprising an ear holding device formed by at least one picking disk (8) having at least one picking gap (10) that ends in an opening at the outer periphery of the picking disk (8) and which rotates around a vertical shaft (9) in a rotation direction (13), at least one picking cylinder located below the picking gap for the purpose of pulling of corn stalks in a downward direction and ripping the ears of corn off their stalks and a covering device (33) that partially reaches over the topside of the picking disk (8) and forms at least one conveying channel (36) for the transport of the ripped-off ears of corn (5) to the harvesting vehicle (2).

2. The harvesting device according to claim 1 wherein the picking gap or each picking gap (10) in the picking disk (8) has a basic radial orientation.

3. The harvesting device according to claim 1 wherein the picking gap or each picking gap (10), starting at an opening (12) at the periphery of the picking disk (8) has an orientation that is divergent from a radius (14) of the picking disk (8) extending across the area of the opening (12) and runs counter to the rotating direction (13) of the picking disk (8).

4. The harvesting device according to claim 1 wherein each picking gap (10) has an opening (12) at the periphery of the picking disk (8) and an engaging tip (15) that is extended in the rotating direction (13) of the picking disk (8) forward of the opening.

5. The harvesting device according to claim 1 wherein the bottom side of the picking disk (8) features a pressure pad

(18) along a trailing edge (17), in the rotating direction (13), of the picking gap or of each picking gap (10).

6. The harvesting device according to claim 1 wherein the picking disk (8) features an ear collecting channel (20) on its topside along a leading edge (19), in the direction of the rotation (13), of the picking gap or of each picking gap (10).

7. The harvesting device according to claim 1 further comprising an adjustable edge trim (21), on the topside of one of the two edges (17, 19) of the picking gap or of each picking gap (10), of the picking disk (8) for modification of the width of the picking gap.

8. The harvesting device according to claim 1 having a multitude of picking disks (8), the vertical shafts (9) of which are positioned in a common vertical cross plane of the picking device (4).

9. The harvesting device according to claim 1 comprising an even-number multiple of picking disks (8) with equal numbers of picking disks (8) being positioned on both sides of a vertical longitudinal center plane (11) of the picking device (4).

10. The harvesting device according to claim 8 wherein the picking disks (8) rotate clockwise on one side of a vertical longitudinal center plane (11) and counterclockwise on the other side of the vertical longitudinal center plane (11) of the picking device (4).

11. The harvesting device according to claim 1 wherein the conveying channel or each conveying channel (36) that is formed by the covering device (33) features a bow-shaped course in accordance with the rotating direction (13) of the pertinent picking disk (8).

12. The harvesting device according to claim 1 wherein the picking cylinder is constituted by at least one toothed roller (23) that is supported by a basic frame (3) of the harvesting device (2) in such a way that the toothed roller (23) can rotate around a horizontal shaft (25).

13. The harvesting device according to claim 12 wherein the toothed roller (23) is supported by the basic frame (3) in an orientation that is perpendicular to the driving direction (24).

14. The harvesting device according to claim 12 wherein the at least one picking disk (8) is configured to have several picking gaps (10) that are distributed equidistant over the circumference and the toothed roller (23) is correlated with all of the rotating picking gaps (10).

15. The harvesting device according to claim 12 wherein the toothed roller (23) is positioned ahead of the rotating shaft (9) of the at least one picking disk(s) (8) in driving direction (24).

16. The harvesting device according to claim 12 wherein a catching gap (30) is formed for the corn stalks (38) between axially spaced teeth (29) of the toothed roller (23) and wherein the catching gaps (30) widen conically radially outward.

17. The harvesting device according to claim 16 wherein the teeth (29) of the toothed roller (23) taper off toward the outside.

18. The harvesting device according to claim 12 wherein the toothed roller (23) is constituted by a multitude of toothed rings (27) that are supported by the roller body (26) and are axially spaced from one another a distance (28).

19. The harvesting device according to claim 18 wherein the axial distance (28) between the toothed rings (27) is approximately 0.5-1 times the axial length of the individual toothed ring (27).

20. The harvesting device according to claim 12 further comprising a stripper device (31) for the purpose of cleaning the toothed roller (23) on the rearward side relative to the driving direction (24).

21. The harvesting device according to claim 20 wherein the stripper element (31) has a comb-like configuration with teeth (32) that engage the gap regions (28) between the toothed rings (27).

\* \* \* \* \*

UNITED STATES PATENT AND TRADEMARK OFFICE
CERTIFICATE OF CORRECTION

PATENT NO.      : 6,374,587 B1
DATED           : April 23, 2002
INVENTOR(S)     : Richard Wubbels et al.

It is certified that error appears in the above-identified patent and that said Letters Patent is hereby corrected as shown below:

<u>Title page,</u>
Item [73], the correct Assignee should be:
-- Maschinenfabrik Kemper GmbH & Co KG, 48703 Stadtlohn, Breul, Germany. --

Signed and Sealed this

Eighteenth Day of March, 2003

JAMES E. ROGAN
*Director of the United States Patent and Trademark Office*